US009860206B2

(12) United States Patent
Gibbon et al.

(10) Patent No.: US 9,860,206 B2
(45) Date of Patent: *Jan. 2, 2018

(54) METHOD AND APPARATUS FOR DISTRIBUTING CONTENT

(71) Applicant: AT&T Intellectual Property I, L.P., Atlanta, GA (US)

(72) Inventors: David Crawford Gibbon, Lincroft, NJ (US); Lee Begeja, Gillette, NJ (US); Raghuraman Gopalan, Union City, CA (US); Zhu Liu, Marlboro, NJ (US); Amy Ruth Reibman, Chatham, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/232,159

(22) Filed: Aug. 9, 2016

(65) Prior Publication Data

US 2016/0352675 A1    Dec. 1, 2016

Related U.S. Application Data

(63) Continuation of application No. 14/080,707, filed on Nov. 14, 2013, now Pat. No. 9,438,647.

(51) Int. Cl.
*G06F 15/16* (2006.01)
*H04L 12/58* (2006.01)
(Continued)

(52) U.S. Cl.
CPC ............ *H04L 51/32* (2013.01); *H04L 65/403* (2013.01); *H04L 67/02* (2013.01); *H04L 67/327* (2013.01);
(Continued)

(58) Field of Classification Search
CPC ......... H04N 2007/145; H04N 21/4126; H04N 7/147; H04N 7/181
See application file for complete search history.

(56) References Cited

U.S. PATENT DOCUMENTS 7,730,216 B1   6/2010  Issa
7,908,237 B2   3/2011  Angell et al.
(Continued)

FOREIGN PATENT DOCUMENTS

EP   2477398 A1    7/2012
WO  2012018271 A1  2/2012
(Continued)

OTHER PUBLICATIONS

Bao, Xuan et al., "VUPoints: Collaborative Sensing and Video Recording through Mobile Phones", ACM SIGCOMM Computer Communication Review, vol. 40, No. 1, Jan. 2010.
(Continued)

*Primary Examiner* — David Lazaro
(74) *Attorney, Agent, or Firm* — Guntin & Gust, PLC; Matthew Tropper

(57) ABSTRACT

Aspects of the subject disclosure may include, for example, receiving a plurality of media content instances, where each media content instance of the plurality of media content instances comprises origination information, identifying a common event from the origination information of each media content instance of the plurality of media content instances, determining a plurality of viewing perspectives of the plurality of media content instances responsive to identifying the common event, and sending an alert to a social network to enable access to a viewing perspective of the plurality of viewing perspectives.

20 Claims, 7 Drawing Sheets

(51) Int. Cl.
- *H04L 29/06* (2006.01)
- *H04N 21/4788* (2011.01)
- *H04N 5/765* (2006.01)
- *H04N 21/2743* (2011.01)
- *H04N 21/4223* (2011.01)
- *H04N 21/6377* (2011.01)
- *H04L 29/08* (2006.01)
- *H04N 9/82* (2006.01)

(52) U.S. Cl.
CPC ........... *H04N 5/765* (2013.01); *H04N 9/8205* (2013.01); *H04N 21/2743* (2013.01); *H04N 21/4223* (2013.01); *H04N 21/4788* (2013.01); *H04N 21/6377* (2013.01); *H04N 9/8227* (2013.01)

(56) References Cited

U.S. PATENT DOCUMENTS

| | | | |
|---|---|---|---|
| 8,181,215 B2 | 5/2012 | Brenner et al. | |
| 8,187,104 B2 | 5/2012 | Pearce | |
| 8,190,607 B2 | 5/2012 | Annambhotla et al. | |
| 8,301,731 B2 | 10/2012 | Naimark et al. | |
| 8,533,284 B2 | 9/2013 | Shoemaker et al. | |
| 8,538,389 B1 | 9/2013 | Evans et al. | |
| 8,538,421 B2 | 9/2013 | Brisebois et al. | |
| 8,612,517 B1* | 12/2013 | Yadid | H04N 21/25891 709/201 |
| 8,844,051 B2 | 9/2014 | Korhonen et al. | |
| 2009/0148124 A1 | 6/2009 | Athsani et al. | |
| 2010/0130226 A1 | 5/2010 | Arrasvuori et al. | |
| 2010/0198828 A1 | 8/2010 | Petersen et al. | |
| 2010/0208082 A1 | 8/2010 | Buchner et al. | |
| 2010/0274816 A1 | 10/2010 | Guzik et al. | |
| 2011/0004922 A1 | 1/2011 | Bono et al. | |
| 2011/0260860 A1 | 10/2011 | Gupta | |
| 2011/0271213 A1 | 11/2011 | Newman et al. | |
| 2012/0278387 A1 | 11/2012 | Garcia et al. | |
| 2012/0320013 A1 | 12/2012 | Perez et al. | |
| 2013/0034306 A1 | 2/2013 | Ivanov et al. | |
| 2013/0066963 A1 | 3/2013 | Odio et al. | |
| 2013/0066964 A1 | 3/2013 | Odio et al. | |
| 2013/0100307 A1 | 4/2013 | Curcio et al. | |
| 2013/0128055 A1 | 5/2013 | Vanderhoff | |
| 2013/0142451 A1 | 6/2013 | Reibman et al. | |
| 2013/0227011 A1 | 8/2013 | Sharma et al. | |
| 2013/0242106 A1 | 9/2013 | Leppänen et al. | |
| 2014/0255005 A1 | 9/2014 | Escamillan et al. | |
| 2014/0258405 A1 | 9/2014 | Perkin et al. | |
| 2015/0082346 A1 | 3/2015 | Baldini | |

FOREIGN PATENT DOCUMENTS

| | | |
|---|---|---|
| WO | 2012044459 A1 | 4/2012 |
| WO | 2013070816 A2 | 5/2013 |

OTHER PUBLICATIONS

Cheng, Xu et al., "NetTube: Exploring Social Networks for Peer-to-Peer Short Video Sharing", IEEE, 2009.

Inamoto, Naho, "Virtual Viewpoint Replay for a Soccer Match by View Interpolation From Multiple Cameras", IEEE Transactions on Multimedia, vol. 9, No. 6, Oct. 2007.

Kennedy, Lyndon et al., "Less Talk, More Rock: Automated Organization of Community-Contributed Collections of Concert Videos", WWW 2009, Apr. 20-24, 2009, Madrid, Spain.

Nathan, "CollaboraTV: Making Television Viewing Social Again", pp. 85-94, axTV'08, Oct. 22-24, 2008.

* cited by examiner

300

METHOD AND APPARATUS FOR DISTRIBUTING CONTENT

CROSS-REFERENCE TO RELATED APPLICATIONS

This application is a continuation of U.S. application Ser. No. 14/080,707, filed Nov. 14, 2013, the disclosure of which is incorporated by reference herein in its entirety.

FIELD OF THE DISCLOSURE

The subject disclosure relates to a method and apparatus for distributing content.

BACKGROUND

With a significant rise in the volume of smart phones, tablets and other portable media processing devices, the collection and exchange of media content has challenged service providers of communication networks to keep up with a high demand for communications bandwidth. Social networks have also placed high demands on storage capacity for media content supplied by its members.

BRIEF DESCRIPTION OF THE DRAWINGS

Reference will now be made to the accompanying drawings, which are not necessarily drawn to scale, and wherein.

DETAILED DESCRIPTION

Figure 1:
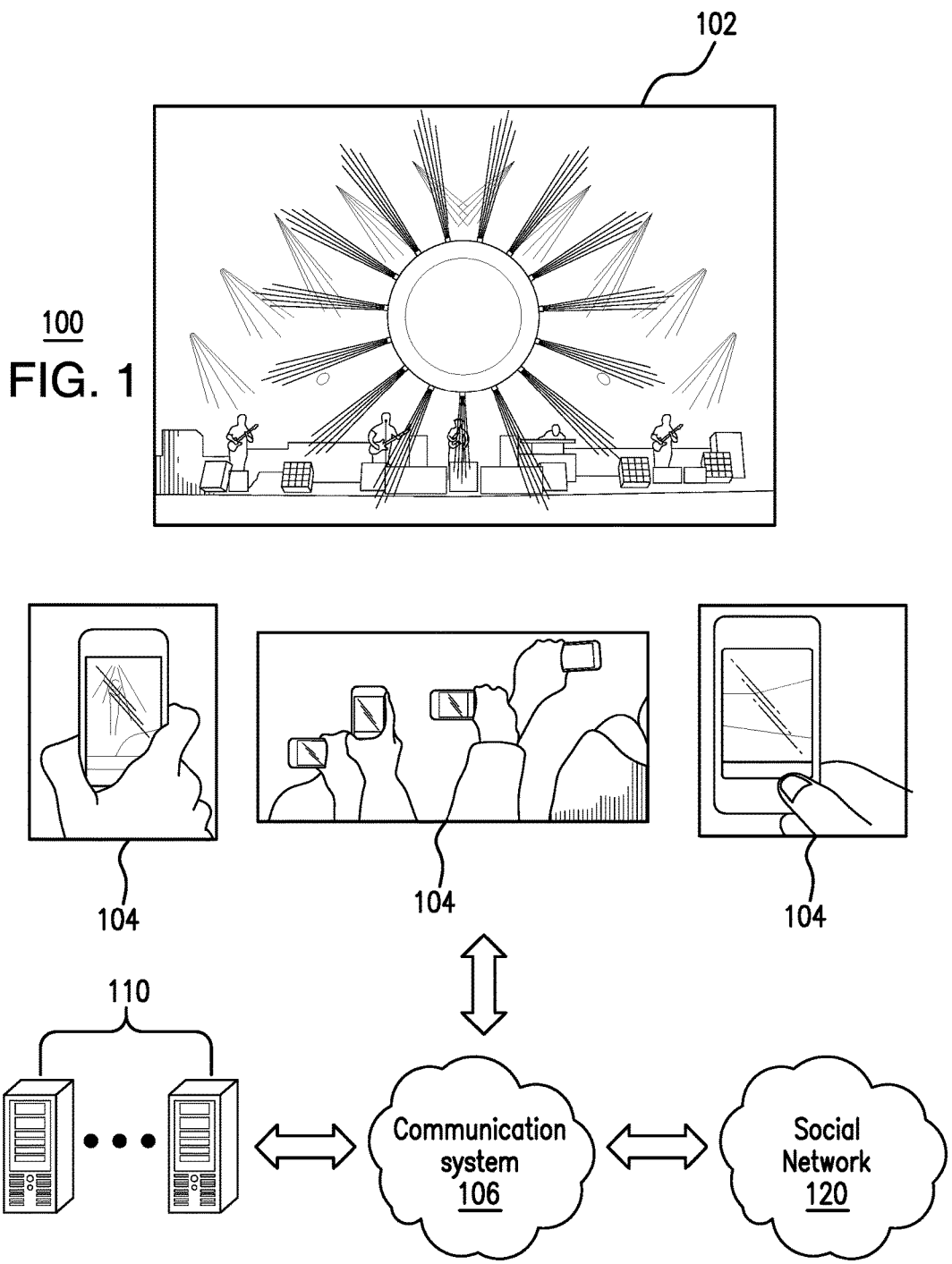
FIG. 1 depicts an illustrative embodiment of a system for sharing content recorded at a common event

The subject disclosure describes, among other things, illustrative embodiments for sharing content in a social setting. Other embodiments are described in the subject disclosure.

One or more aspects of the subject disclosure include obtaining live or recorded content from members of a social network, detecting that the content may be associated with a same event, analyzing the content to identify viewing perspectives of the event, and alerting members of the social network of an availability to access the live or recorded content. Other aspects of the subject disclosure can also include prioritizing access to the viewing perspectives according to resource limitations of the devices used by member of the social network, reputation of members providing the live or recorded content, network traffic conditions of a network providing the social network access to the content, a viewing quality of the different viewing perspectives, or combinations thereof.

One embodiment of the subject disclosure includes a device having a processor and a memory that stores executable instructions that, when executed by the processor, facilitate performance of operations including receiving a plurality of media content instances, where each media content instance of the plurality of media content instances comprises content information, orientation information, and temporal information. The operations can further include identifying a common event from the orientation information and the temporal information of each media content instance of the plurality of media content instances, determining a plurality of viewing perspectives of the plurality of media content instances responsive to identifying the common event, and sending an alert to a social network to enable access to a viewing perspective of the plurality of viewing perspectives.

One embodiment of the subject disclosure includes a machine-readable storage medium, comprising executable instruction that, when executed by a processor, facilitate performance of operations including receiving a plurality of media content instances, where each media content instance of the plurality of media content instances comprises origination information. The operations can further include identifying a common event from the origination information of each media content instance of the plurality of media content instances, determining a plurality of viewing perspectives of the plurality of media content instances responsive to identifying the common event, and sending an alert to a social network to enable access to a viewing perspective of the plurality of viewing perspectives.

One embodiment of the subject disclosure includes a method for obtaining, by a system comprising a processor, a plurality of media content instances with location information, identifying, by the system, a common event from the location information of each media content instance of the plurality of media content instances. The method can also include determining, by the system, a plurality of viewing perspectives of the plurality of media content instances responsive to identifying the common event, and sending, by the system, an alert to a social network to enable access to a viewing perspective of the plurality of viewing perspectives.

Figure 2:
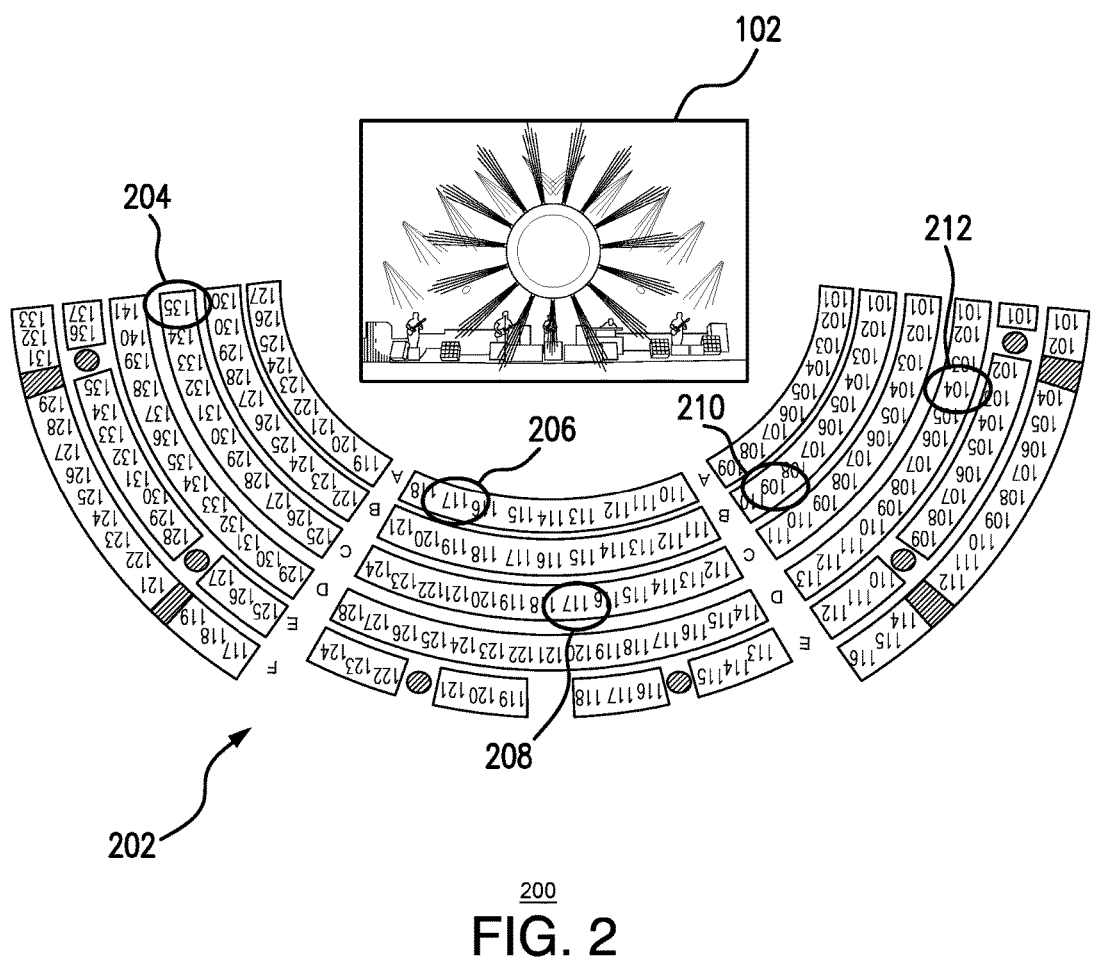
FIG. 2 depicts an illustrative embodiment of the perspectives of users recording media content at the event depicted in FIG. 1.

FIG. 1 depicts an illustrative embodiment of a system 100 for sharing content in a social setting. FIG. 1 depicts different users of communication devices 104 recording a concert event 102 using a video camera feature of communication devices 104. Each user can have different seating arrangements 204-212 as shown in the seating chart 202 of FIG. 2. System 100 can comprise servers 110 which can be communicatively coupled to the communication devices 104 and to a social network 120 by way of communication system 106. Communication system 106 can be a circuit switched or packet switched network for landline or wireless communications. The social network 120 can comprise computing and communication technology to enable members of the social network 120 to share content with each other via equipment of the members, which is communicatively coupled to the social network 120.

Figure 3:
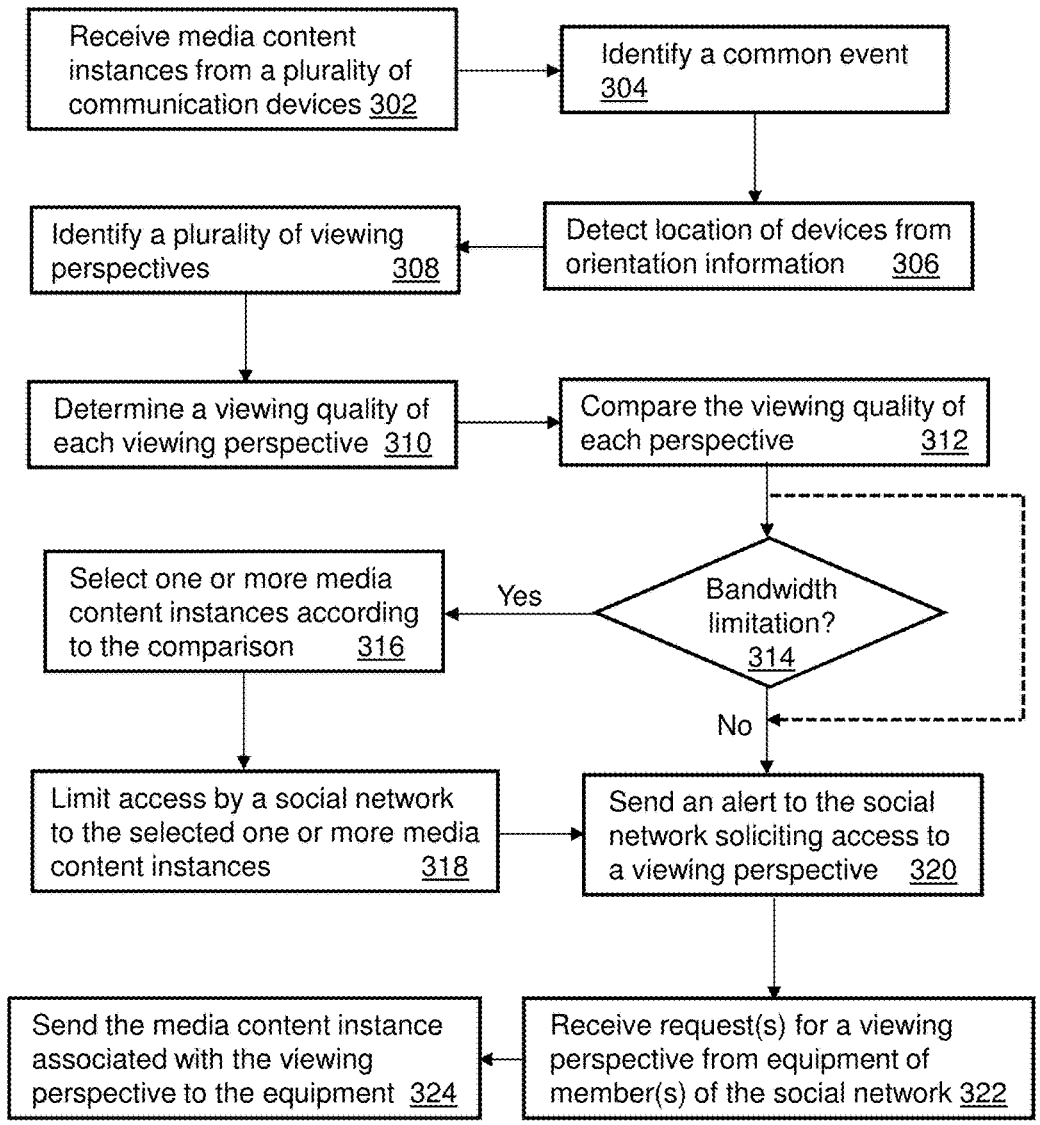
FIG. 3 depicts an illustrative embodiment of a method used in portions of the system described in FIG. 1.

Servers 110 can receive information from the communication devices 104 such as content information, orientation information, and temporal information via the communication system 106. The content information can comprise metadata descriptive of the content being recorded, and/or the recorded content itself. The orientation information can include global positioning system (GPS) coordinate information and compass information derived from a GPS receiver and a magnetometer included in the communication devices 104. The temporal information can include times stamps indicating various recording points in the content. The servers 110 can be configured to share content with members of the social network 120 as described by method 300 of FIG. 3 described below.

Method 300 can begin with step 302 where the servers 110 receive media content instances from a plurality of communication devices 104 such as shown in FIG. 1. The media content instances can include the content information, orientation information and temporal information referred to above. At step 304 the servers 110 can in one embodiment identify a common event associated with the media content instances received from the communication devices 104 by analyzing the recorded content using image processing technology and thereby determining from the analyzed images that each communication device 104 is recording a concert event. The servers 110 can analyze the orientation information of each communication device 104 and determine from GPS coordinates that the communication devices 104 are located in a stadium from which the media instances of the concert are being recorded. Based on the location of the stadium, and a date and time retrieved from the temporal information provided with the media content instances, the servers 110 can search public postings from the stadium and identify the artists involved in the concert. Alternatively, if the stadium has not publicized the concert, the servers 110 can utilize image processing technology to identify the artists depicted in the media content instances. For instance, in one embodiment, image processing techniques such as scale-invariant feature transformation (SIFT) point matching with geometric transformation verification for registering images can be used to determine if two or more images contain some portion of the same scene content. A SIFT algorithm or other suitable image processing algorithm can be used for detecting when media content provided by communication devices of multiple users is associated with a common event.

In another embodiment, the servers 110 can further determine a date and time when the media content instances are being recorded. Based on the combined information that the recordings are taking place at a particular stadium, on a particular date and time, the servers 110 can search for events posted by the stadium during this time and discover that the event is a concert of a recognized artist. If public postings are not available, the servers 110 can utilize image processing technology to identify the artists as noted above. In step 306, the servers 110 can determine the location of the communication devices 104 within the stadium. With GPS coordinate information, the servers 110 can determine the seating arrangement of each user of the communication devices 104 as depicted by references 204-212 in FIG. 2. From the seating positions, the servers 110 can further identify at step 308 a plurality of perspectives for the media content instances received from the communication devices 104. For instance, users 204, 210 and 212 have left and right perspectives of the concert stage 102, while users 206 and 208 have near front stage views of the concert stage 102.

At step 310, the servers 110 can further determine a viewing quality of each perspective by analyzing the recorded content. The servers 110 can, for example, sample content from each communication device 104 to perform a quality analysis of the media content instances to measure temporal jerkiness (e.g., due to the user's shaky hand, camera instabilities, etc.), blurry content due to fast panning action or out of focus recording, and so on. The server 110 can also determine viewing quality from the resolution of the cameras of each communication device 104. The servers 110 can also determine a desirability measure of each perspective based on the artist that is being captured in the media content instances. For example, if the lead singer is being captured on a side perspective by user 204, while user 206 is capturing the guitarist which may be less popular, then the servers 110 can assign a higher quality measure to the media content instance provided by the communication device 104 of user 204 than the quality measure assigned to the media content instance provided by the communication device 104 of user 206. The servers 110 can use image processing technology to process the images in the media content instances to assess the artists being captured in these images.

Once the viewing quality of each perspective of the media content instances provided by the communication devices 104 has been determined in step 310, the servers 110 can compare results in step 312 to rank quality levels of perspectives of the media content instances. At step 314, the servers 110 can further determine whether communication system 106 of FIG. 1 has sufficient bandwidth to offer streaming content for all perspectives to members of the social network 120. If traffic conditions of the communication system 106 are high at the time the media content instances are to be offered by the servers 110, then the servers 110 can proceed to step 316 and select a subset of one or more media content instances from all media content instances according to the comparisons performed in step 312, and limit access at step 318 by members of the social network 120 to only the selected one or more media content instances. Step 316 can be used to reduce the impact of adding additional traffic congestion to the communication system 106.

At step 320, members of the social network 120 can be alerted to only the media content instances selected in step 316 when limited bandwidth is detected at step 314, or the members can be alerted to all media content instances when there are no bandwidth constraints. In an embodiment where bandwidth limitations are not monitored, steps 314, 316, and 318 can be skipped as shown by the dotted line from step 312 to step 320. The alert sent to equipment of the members of the social network 120 can include metadata information that describes the event (e.g., a concert of a particular artist), the location and time of the event, whether the event is live or pre-recorded, the quality of each perspective that is being offered for viewing, and rankings generated by the servers 110 indicating which of the perspectives may be more desirable than others.

The alerts can be sent by the servers 110 as short messaging service (SMS) messages or multimedia messaging service (MMS) messages. The alert messages can be presented as advertisements to members of the social network 120. MMS messages can include thumbnail still images or short video segments of the media instances available for selection. Alternatively or in combination, the alerts can be email messages. Other messaging techniques suitable to the subject disclosure can be used with method 100. To avoid a significant increase in traffic congestion, in one embodiment, the alert messages do not include a copy or stream of content associated with the media content instances. In this case, the messages serve to indicate that content is available and may be of interest to others. In other embodiments, certain members of the social network 120 may configure their accounts with user profiles to automatically receive a copy or stream with the alert messages. The alerts can be directed to equipment used by members of the social network 120 such as the servers used by the social network 120, or smart phones, or tablets used by the members. The servers 110 can receive information from the social network 120 to determine which equipment to direct alert messages to.

At step 322, the servers 110 can receive requests from equipment of members of the social network 120 for a particular viewing perspective of the media content instances. In one embodiment, the requests can be initiated by members of the social network 120 by selecting one of the perspectives provided in the alert messages. In another embodiment, some members of the social network 120 can have user profiles configured to automatically select the perspective with the highest ranking given by the servers 110. Responsive to the requests, the servers 110 can send in step 324 to the equipment of the members of the social network 120 the media instances associated with the viewing perspectives selected. To improve transmission efficiency of the communication system 106, multicast streaming can be used for members who select the same media content instances. In this embodiment, intermediate network nodes of communication system 106 can be configured to schedule a multicast streamed transmission. For members who want immediate service and who submit non-concurrent requests, the servers 110 can facilitate unicast streamed transmissions.

The servers 110 can facilitate communications between the communication devices 104 and the equipment of the members of the social network 120. In one embodiment, the servers 110 can direct the communication devices 104 to stream content from the communication devices 104 directly to the equipment of the members of the social network 120. In another embodiment, the servers 110 can direct the communication devices 104 to provide the media content instances to the servers 110 and the servers 110 can distribute the content to the equipment of the members of the social network 120. Other suitable distribution techniques can be used.

The foregoing embodiments of method 300 can be applied to any event. For example, method 300 can be applied in instances where users of communication devices 104 record a news event, a sports event, or otherwise, which may be of interest to members of the social network 120. Method 100 can also be adapted to group members of the social network 120 according to their interests and sub-categorize which alerts are sent to which member groups. For instance, the servers 110 can be configured to track the behavior of members of the social network 120 according to their selections of subject matter provided by other members, determine from such selections a bias by certain members to certain subject matter, and thereby identify sub-groupings of members within the social network 120 according to a subject matter of interest. Accordingly, when a subject matter of interest to a particular sub-grouping of members is detected, the servers 110 can be configured to selectively alert only the particular sub-grouping. User profiles can also be provided by members of the social network 120 that identify subject matter of interest to such members. The servers 110 can also be configured to identify sub-groupings according to the user profiles.

Figure 4:
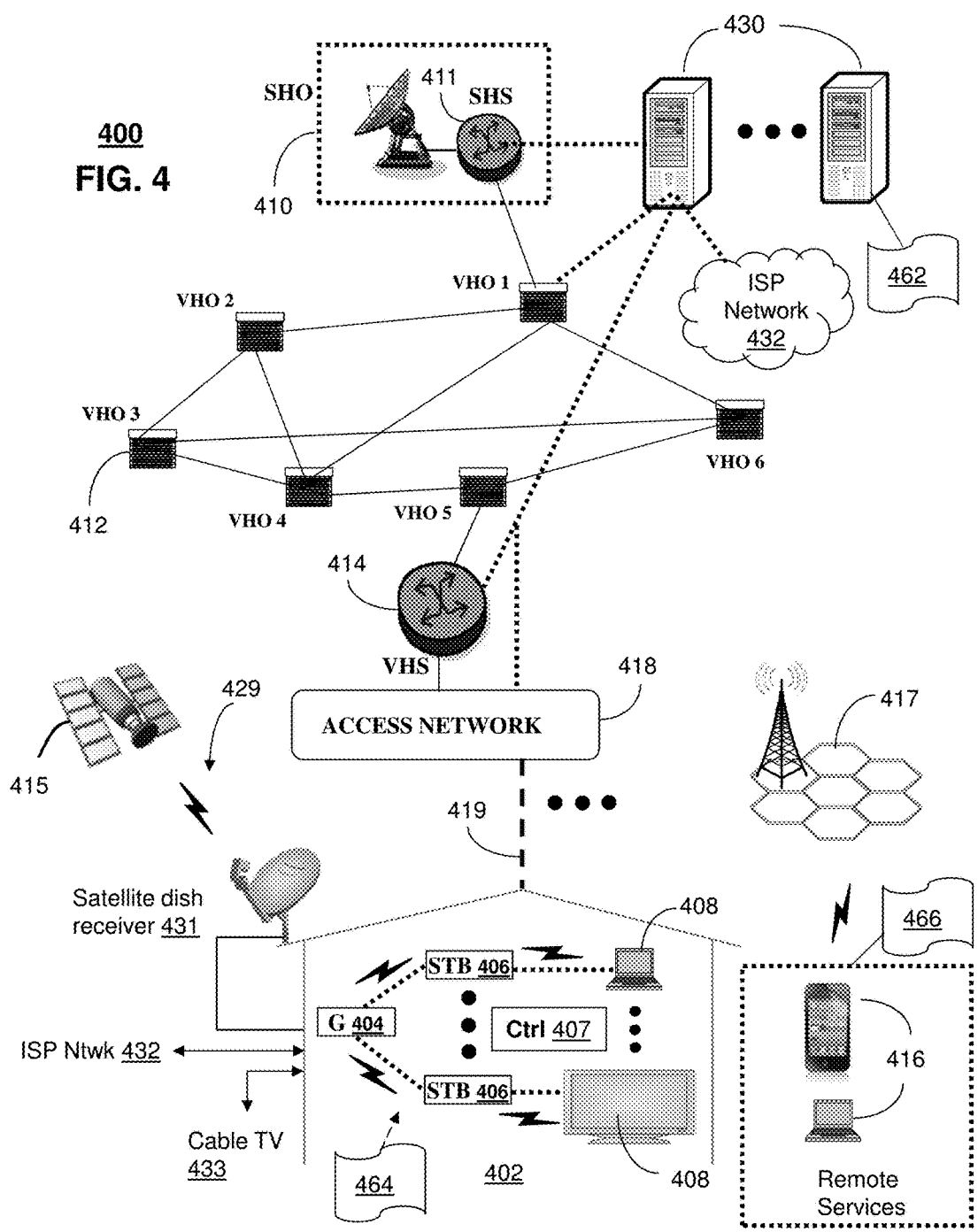
FIGS. 4-5 depict illustrative embodiments of communication systems that provide media services according to the embodiments of the method of FIG. 3.

FIG. 4 depicts an illustrative embodiment of a first communication system 400 for delivering media content. The communication system 400 can represent an Internet Protocol Television (IPTV) media system. Communication system 400 can be overlaid or operably coupled with system 100 of FIG. 1 as another representative embodiment of communication system 400. Additionally, communication system 400 can be configured to perform the service delivery techniques described by method 300 of FIG. 3. For instance, one or more devices illustrated in the communication system 400 of FIG. 4 can be configured to perform operations including receiving a plurality of media content instances, where each media content instance of the plurality of media content instances comprises origination information, identifying a common event from the origination information of each media content instance of the plurality of media content instances, determining a plurality of viewing perspectives of the plurality of media content instances responsive to identifying the common event, and sending an alert to user equipment to enable access to a viewing perspective of the plurality of viewing perspectives.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a server (herein referred to as server 430). The server 430 can use computing and communication technology to perform function 462, which can include among other things, the service delivery techniques described by method 300 of FIG. 3. For instance, function 462 of server 430 can be similar to the functions described for servers 110 of FIG. 1 in accordance with method 300. The media processors 406 and wireless communication devices 416 can be provisioned with software functions 464 and 466, respectively, to utilize the services of server 430. For instance, functions 464 and 466 of the media processors 406 and wireless communication devices 416 can be similar to the functions described for the communication devices 104 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
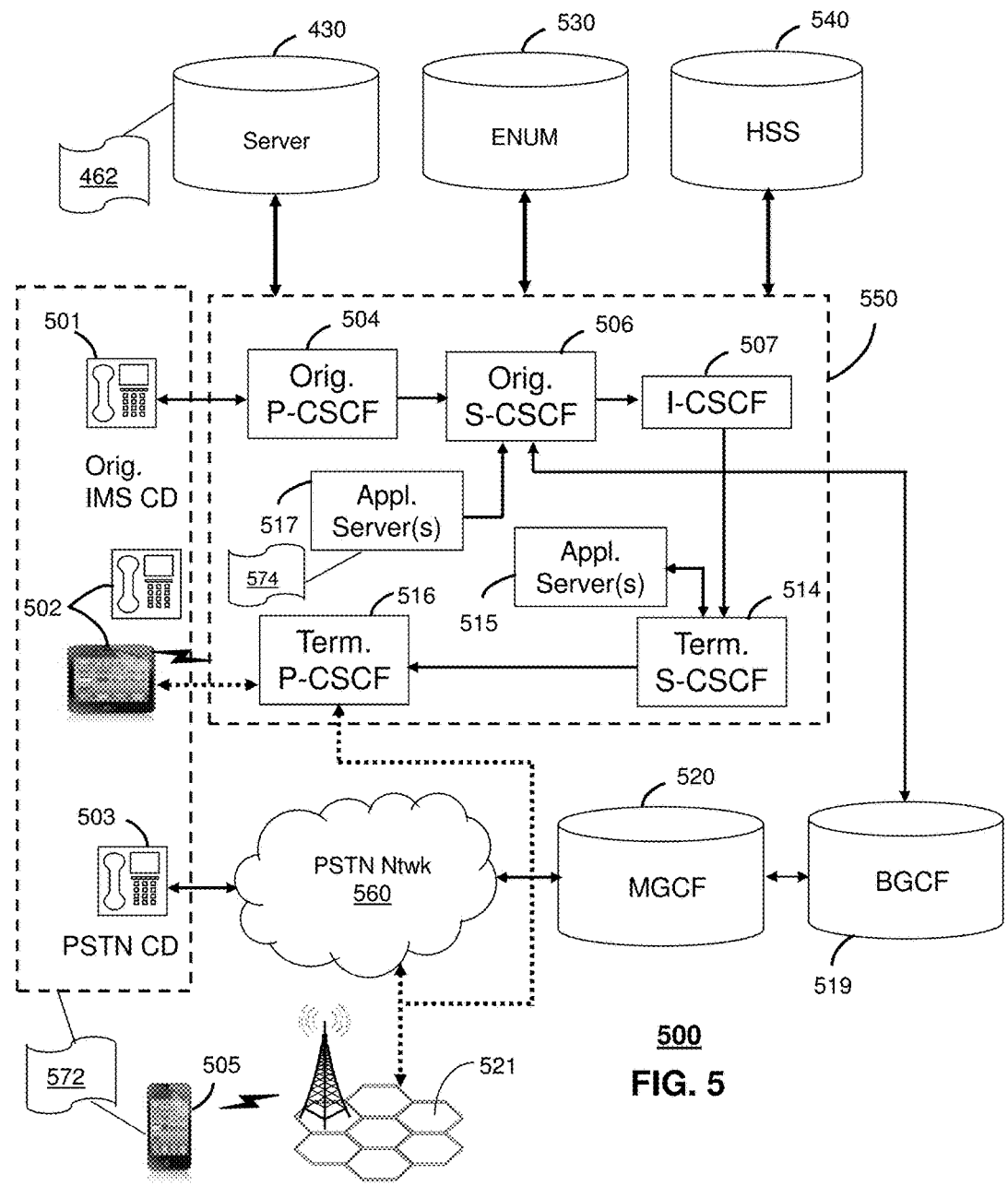

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. Additionally, communication system 500 can be configured to perform the service delivery techniques described by method 300 of FIG. 3. For instance, one or more devices illustrated in the communication system 500 of FIG. 5 can be configured to perform operations including receiving a plurality of media content instances, where each media content instance of the plurality of media content instances comprises origination information, identifying a common event from the origination information of each media content instance of the plurality of media content instances, determining a plurality of viewing perspectives of the plurality of media content instances responsive to identifying the common event, and sending an alert to user equipment to enable access to a viewing perspective of the plurality of viewing perspectives.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 430 of FIG. 4 can be operably coupled to the second communication system 500 for purposes similar to those described above. Server 430 can perform function 462 and thereby provide media content delivery services to the CDs 501, 502, 503 and 505 of FIG. 5 similar to the functions described for servers 110 of FIG. 1 in accordance with method 300 of FIG. 3. CDs 501, 502, 503 and 505, which can be adapted with software to perform function 572 to utilize the services of the server 430 similar to the functions described for communication devices 104 of FIG. 1 in accordance with method 300 of FIG. 3. Server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
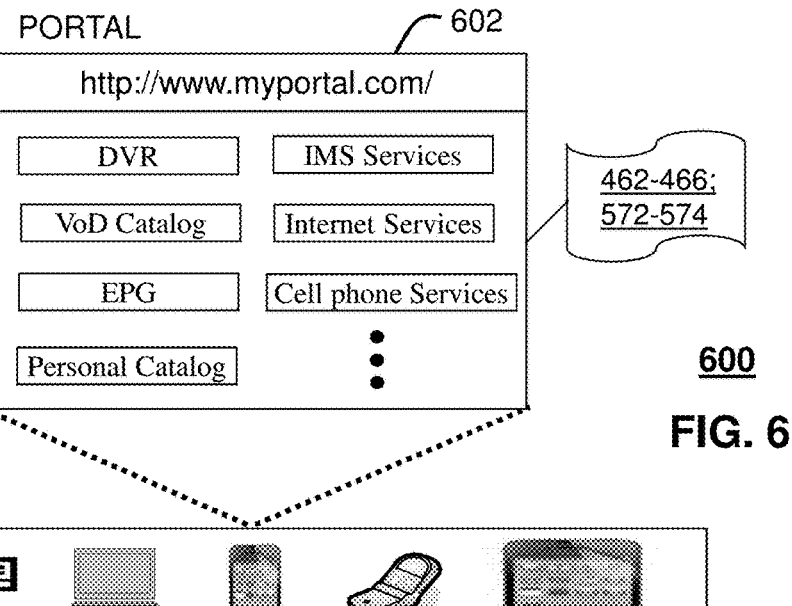
FIG. 6 depicts an illustrative embodiment of a web portal for interacting with the communication systems of FIGS. 1 and 4-5.

FIG. 6 depicts an illustrative embodiment of a web portal 602 of communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of communication systems 400-500. A web page of the web portal 602 can be accessed by a Uniform Resource Locator (URL) with an Internet browser using an Internet-capable communication device such as those described in FIGS. 1-2. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of system 100 of FIG. 1 and communication systems 400-500 of FIGS. 4-5.

Figure 7:
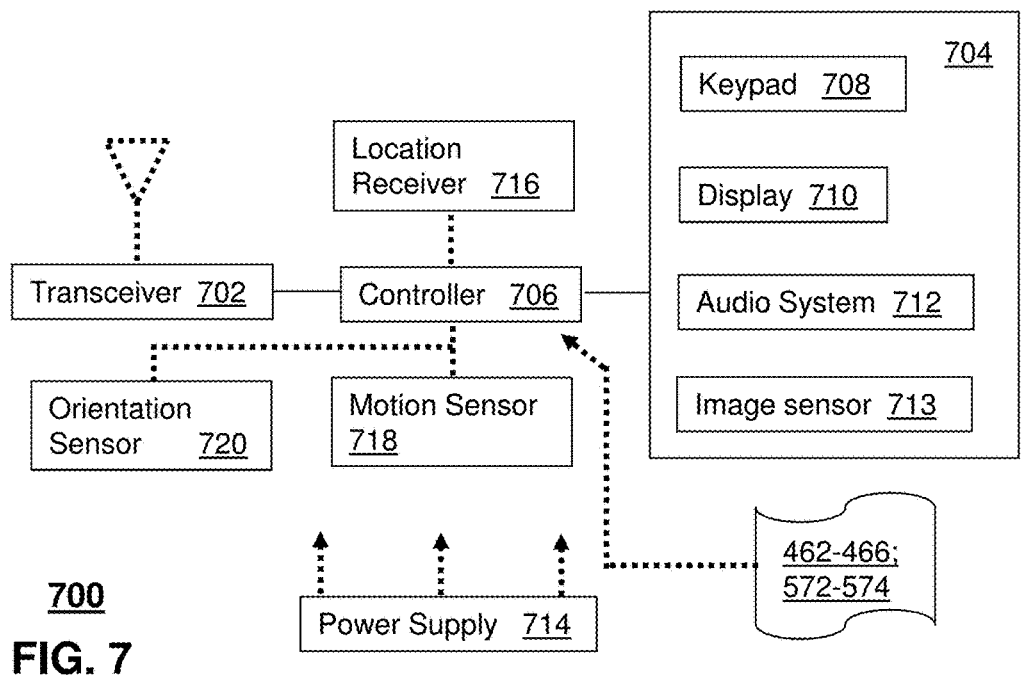
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and 4-5. Additionally, communication device 700 can be configured to perform in whole or in part the service delivery techniques described by method 300 of FIG. 3. For instance, members of the social network 120 can log into their on-line accounts and provision the servers 110 or server 430 with user profiles that identify subject matter of interest to the members, contact information of the communication devices 104 of the members to enable the servers 110 or server 430 to access such devices, and so on. Service providers can log onto an administrator account to provision, monitor and/or maintain the servers 110 or server 430.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the portable communication devices 104 of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system 100, and communication systems 400-500 of FIGS. 4-5 such as a gaming console and a media player.

The communication device 700 shown in FIG. 7 or portions thereof can serve as a representation of one or more of the devices of system 100 of FIG. 1, communication system 400, and communication system 500. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, method 100 can be applied to post-recorded content. Accordingly, step 304 can apply to real-time, near real-time, and non-real-time media content. Method 100 can be further adapted to enable third parties such as news organizations or broadcasters to subscribe to the above services and tap into media content instance feeds which can be combined by the news agency or broadcasters with other programming as an ancillary broadcast of content for its viewers. It is further noted that communication devices 104 can be configured with software clients that perform the embodiments described for method 300 of FIG. 3. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
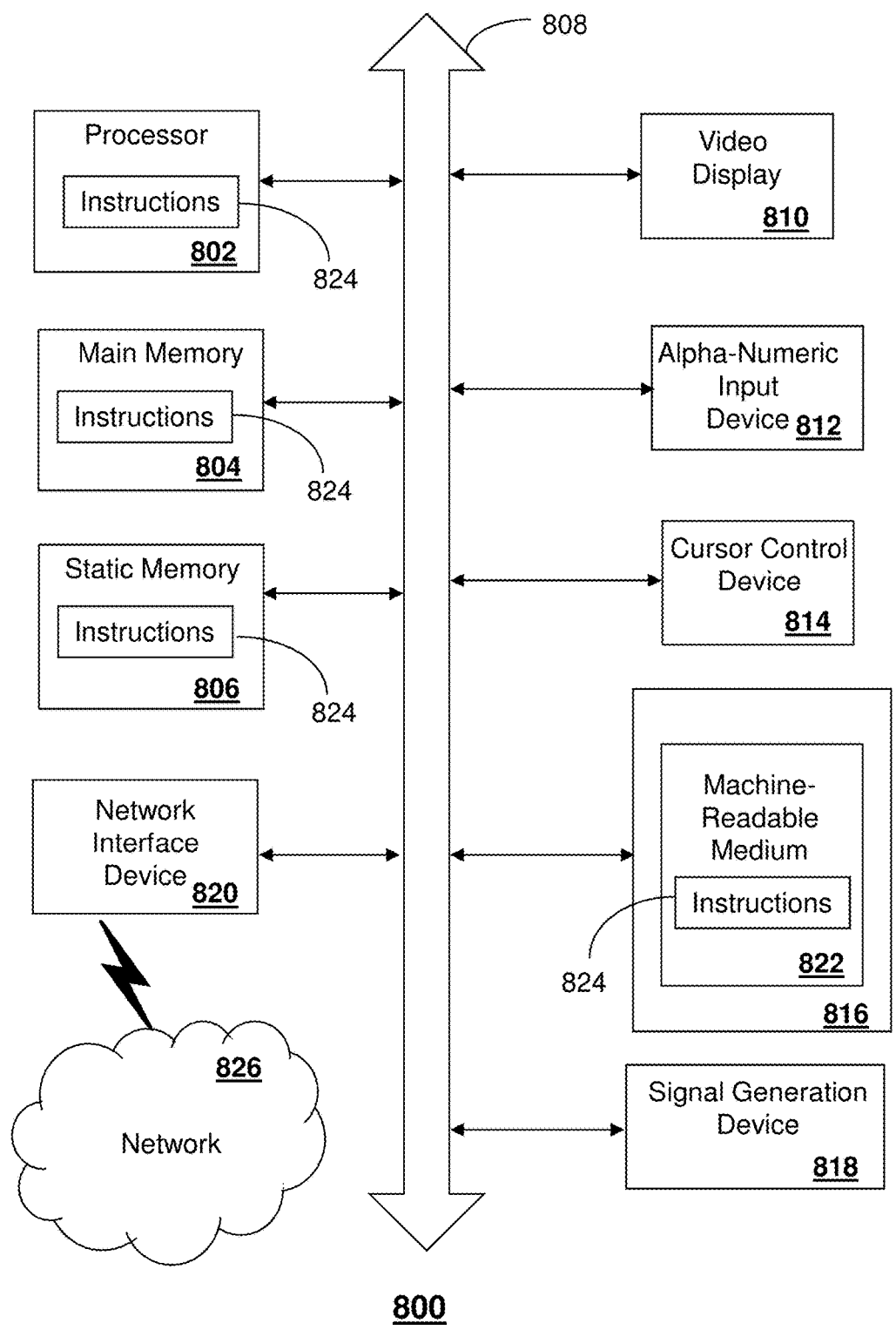
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the communication devices 104, servers 110, server 430, the media processor 406 and other devices of FIGS. 1 and 4-5. In some embodiments, the machine may be connected (e.g., using a network 826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure, including combining one or more features of one embodiment with one or more features of another embodiment. The exemplary embodiments can also expressly exclude one or more of the features that are described with respect to the particular embodiment.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processor; and
a memory that stores executable instructions that, when executed by the processor, facilitate performance of operations, comprising:
determining a plurality of viewing perspectives of a plurality of media content instances of a common event, wherein the plurality of media content instances comprises content information, location information, and temporal information;
determining qualities of the plurality of viewing perspectives;
comparing the qualities of the plurality of viewing perspectives;
detecting a limitation in communication resources that prevents presentation of the plurality of viewing perspectives;
selecting a proper subset of viewing perspectives from the plurality of media content instances according to the limitation and the comparing;
limiting access by a social network to the proper subset of viewing perspectives selected; and
sending an alert to the social network to enable access to the proper subset of viewing perspectives.

2. The device of claim 1, wherein the operations further comprise identifying the common event from a search result, wherein the search result is performed by searching for one or more events according to the location information and the temporal information.

3. The device of claim 1, wherein the processor comprises a plurality of processors operating in a distributed processing environment.

4. The device of claim 1, wherein the qualities comprise an assessment of a desirability of viewing perspective of each of the plurality of viewing perspectives.

5. The device of claim 1, wherein the qualities comprise an assessment of a resolution quality of each of the plurality of viewing perspectives.

6. The device of claim 1, wherein the qualities comprise an assessment of a steadiness of images recorded, a blurriness of the images recorded, an over exposure of the images recorded, an under exposure of the images recorded, or any combination thereof.

7. The device of claim 1, wherein the location information of each of the plurality of media content instances comprises coordinate data and compass data from which at least a portion of each of the plurality of media content instances is recorded, and wherein the content information comprises one of still image content, video content, audio content or any combination thereof.

8. The device of claim 1, wherein the alert comprises an advertisement for soliciting access to the proper subset of viewing perspectives.

9. The device of claim 1, wherein the common event comprises a social event taking place at or near a location identified by the location information associated with a media content instance of the plurality of media content instances, wherein the operations further comprise analyzing each media content instance associated with the plurality of viewing perspectives to generate metadata descriptive of the common event, and wherein the alert comprises the metadata.

10. The device of claim 1, wherein the plurality of media content instances are supplied by a plurality of communication devices used by members of the social network, and wherein the alert is sent to the social network responsive to receiving a request from a communication device of the plurality of communication devices.

11. The device of claim 1, wherein a media content instance of the plurality of media content instances is pre-recorded by a communication device.

12. The device of claim 1, wherein the operations further comprise detecting a subject matter from a media content instance of the plurality of media content instances, and wherein the alert is sent to the social network responsive to the detecting the subject matter.

13. The device of claim 1, wherein the operations further comprise:
receiving from equipment communicatively coupled to the social network a request for a media content instance associated with a viewing perspective; and
sending to the equipment the content information associated with the media content instance responsive to receiving the request.

14. The device of claim 13, wherein the content information associated with the media content instance is streamed to the equipment while the plurality of media content instances are being recorded by a plurality of communication devices located at or near a location where the common event is taking place, and wherein the content information is streamed from one of the plurality of communication devices recording the viewing perspective associated with the media content instance requested.

15. A non-transitory machine-readable storage medium, comprising executable instructions that, when executed by a processor, facilitate performance of operations, comprising:
determining a plurality of viewing perspectives of a plurality of media content instances associated with a common event;
determining viewing qualities of the plurality of viewing perspectives;
comparing the viewing qualities of the plurality of viewing perspectives;
detecting a limitation in communication resources that prevents presentation of the plurality of viewing perspectives;
selecting a proper subset of viewing perspectives from the plurality of media content instances according to the limitation and comparison;
limiting access by a social network to the proper subset of viewing perspectives selected; and
sending an alert to the social network to enable access to the proper subset of viewing perspectives.

16. The non-transitory machine-readable storage medium of claim 15, wherein each media content instance of the plurality of media content instances comprises orientation information, temporal information, or combinations thereof, and wherein the operations further comprise:
determining a prioritization of the plurality of viewing perspectives of the plurality of media content instances according to one of a viewing quality of each of the plurality of viewing perspectives, a state of resources of a network that provides the social network access to the plurality of viewing perspectives, a reputation obtained from the social network of an author of each of the plurality of viewing perspectives of the plurality of media content instances, or any combination thereof; and
wherein selecting the proper subset of viewing perspectives is performed according to the prioritization and limitation.

17. The non-transitory machine-readable storage medium of claim 15, wherein the operations further comprise:
receiving from equipment communicatively coupled to the social network a request for a media content instance associated with a viewing perspective; and
sending, to the equipment, content information associated with the media content instance responsive to receiving the request.

18. The non-transitory machine-readable storage medium of claim 15, wherein each of the plurality of media content instances comprises a coordinate location from which at least a portion of each of the plurality of media content instances is recorded, and wherein the processor comprises a plurality of processors operating in a distributed processing environment.

19. A method, comprising:
obtaining, by a system comprising a processor, a plurality of media content instances with location information that indicates an association with a common event;
determining, by the system, a plurality of viewing perspectives of the plurality of media content instances responsive to identifying the common event;
detecting, by the system, a limitation in communication resources that prevents presentation of the plurality of viewing perspectives;
selecting, by the system, a proper subset of viewing perspectives from the plurality of media content instances according to the limitation;
limiting access, by the system, to the proper subset of viewing perspectives selected; and
sending, by the system, an alert to a social network to enable access to the proper subset of viewing perspectives.

20. The method of claim 19, wherein the system is a communication device of a plurality of communication devices supplying the plurality of media content instances.

* * * * *